United States Patent [19]
Silvestri et al.

[11] Patent Number: 5,834,562
[45] Date of Patent: *Nov. 10, 1998

[54] THERMOPLASTIC COMPOSITIONS OF ATACTIC AND SYNDIOTACTIC POLYPROPYLENE

[75] Inventors: Rosanna Silvestri, Schio; Luigi Resconi, Ferrara; Anteo Pelliconi, Santa Maria Maddalena, all of Italy

[73] Assignee: Montell Technology Company BV, Hoofddorp, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 512,674

[22] Filed: Aug. 8, 1995

[30] Foreign Application Priority Data

Aug. 9, 1994 [IT] Italy .................. MI94A1728

[51] Int. Cl.⁶ .................................................. C08L 23/12
[52] U.S. Cl. ........................................ 525/240; 526/351
[58] Field of Search ............................. 525/240; 526/351

[56] References Cited

U.S. PATENT DOCUMENTS

| | | | |
|---|---|---|---|
| 3,258,455 | 6/1966 | Natta et al. . | |
| 3,305,538 | 2/1967 | Natta et al. . | |
| 4,335,225 | 6/1982 | Collette et al. ........................ | 525/240 |
| 4,892,851 | 1/1990 | Ewen et al. . | |
| 5,266,641 | 11/1993 | Asanuma et al. ...................... | 525/240 |
| 5,270,410 | 12/1993 | Job ......................................... | 526/351 |
| 5,476,914 | 12/1995 | Ewen et al. ............................ | 526/351 |

FOREIGN PATENT DOCUMENTS

| | | |
|---|---|---|
| 0 395 055 A1 | 10/1990 | European Pat. Off. . |
| 0455813 | 6/1991 | European Pat. Off. . |
| 0 464 684 A2 | 1/1992 | European Pat. Off. . |
| 0 604 917 A2 | 7/1994 | European Pat. Off. . |
| 666 284 | 8/1995 | European Pat. Off. . |

OTHER PUBLICATIONS

Quirk et al., "Physical Constants of Poly(propylene)", Polymer Handbook, 3rd ed., Brandrup et al. ed., John Wiley & Sons, New York, p. V–31(1989).

Whelan, Polymer Technology Dictionary, Chapman & Hill, New York, p. 23 (1994).

*Primary Examiner*—Donald R. Wilson
*Attorney, Agent, or Firm*—Bryan Cave LLP

[57] ABSTRACT

Thermoplastic polymer compositions are disclosed which comprise the following components:

(A) 1 to 99% by weight of an amorphous propylene polymer having the following characteristics:

$[\eta] > 1$ dl/g,

% of syndiotactic dyads (r)–% of isotactic dyads (m)>0, less than 2% of the $CH_2$ groups contained in $(CH_2)_n$ sequences wherein $n \geq 2$, Bernoullianity index=1±0.2; and (B) 1 to 99% by weight of a propylene polymer having an essentially syndiotactic structure, optionally containing from 0.1 to 30% by moles of units deriving from α-olefins of formula $CH_2$=CHR in which R is an hydrogen atom or an alkyl group having from 2 to 10 carbon atoms.

The compositions of the invention are endowed with good elasto-mechanical properties and are suitable for the production of low-temperature-heat-sealing films.

13 Claims, No Drawings

THERMOPLASTIC COMPOSITIONS OF ATACTIC AND SYNDIOTACTIC POLYPROPYLENE

BACKGROUND OF THE INVENTION

1. Field of the Invention

The present invention relates to thermoplastic polymer compositions, particularly to propylene polymers compositions having good elastic properties. The invention also relates to manufactured articles, particularly low-temperature-heat-sealing films, obtainable from those compositions.

2. Description of the Prior Art

As is well known, syndiotactic polypropylene can be defined as a polypropylene in which, according to the Fisher representation, the methyl groups bound to the tertiary carbon atoms of the successive monomer units of the chain lie alternately on one side and on the other side relative to the plane of the chain itself.

Syndiotactic polypropylene and its preparation were first described by Natta in U.S. Pat. No. 3,258,455. In this patent, syndiotactic polypropylene was prepared by using a catalyst prepared from titanium trichloride and diethylaluminum monochloride.

Subsequently, the use of vanadium triacetylacetonate and of vanadium halides in combination with organic aluminum compounds for the preparation of syndiotactic polypropylene was described in U.S. Pat. No. 3,305,538.

However, the polymers obtained with the catalysts described in the abovementioned patents is characterized by unsatisfactory syndiotacticity indices.

The preparation of a polypropylene with high syndiotacticity indices is described in U.S. Pat. No. 4,892,851, in which the polymerization is carried out in the presence of catalysts consisting of specific metallocene compounds and of poly-methylalumoxanes. In particular, the preferred catalysts used in U.S. Pat. No. 4,892,851 consist of isopropylidene(cyclopentadienyl)(fluorenyl)zirconium dichloride [$Me_2C(Cp)(9-Flu)ZrCl_2$], or of the corresponding hafnium compound, and of methylalumoxane (MAO) having an average molecular weight of about 1300. Polymerizations carried out in liquid propylene in the presence of these catalysts, allow crystalline polypropylene with syndiotacticity indices greater than 90% to be prepared.

However, the highly syndiotactic and crystalline polypropylene thus obtainable is characterized by unsatisfactory elastic properties, especially when it is subjected to high deformations.

Moreover, the sealing temperature of the films obtainable from this syndiotactic polypropylene are not enough low to allow its advantageous use in the field of low-temperature-heat-sealing films.

Therefore, in order to extend the field of possible applications of this syndiotactic polypropylene, it is necessary to improve both the elastic properties of syndiotactic polypropylene and the sealing temperatures of the films obtained therefrom.

SUMMARY OF THE INVENTION

Compositions of propylene polymers have now unexpectedly been found which show improved elasto-mechanical properties as compared with syndiotactic polypropylene. Moreover, films obtainable thereof possess lower sealing temperatures with respect to those of films obtained from syndiotactic polypropylene.

Thus, according to a first object, the present invention provides a thermoplastic composition comprising:

(A) 1 to 99% by weight of an amorphous propylene polymer having the following characteristics:
[$\eta$]>1 dl/g,
% of syndiotactic dyads (r)–% of isotactic dyads (m)>0,
less than 2% of the $CH_2$ groups contained in $(CH_2)_n$ sequences wherein $n \geq 2$,
Bernoullianity index=1±0.2; and (B) 1 to 99% by weight of a propylene polymer having an essentially syndiotactic structure, optionally containing from 0.1 to 30% by moles of units deriving from α-olefins of formula $CH_2=CHR$ in which R is an hydrogen atom or an alkyl group having from 2 to 10 carbon atoms.

According to another object, the present invention provides manufactured articles obtainable from a thermoplastic composition according to the invention.

DESCRIPTION OF THE PREFERRED EMBODIMENTS

The ratio of the quantities by weight of the components (A)/(B) of the composition of the present invention is preferably comprised between 5:95 and 95:5, more preferably between 10:90 and 90:10, still more preferably between 30:70 and 70:30.

It has been observed that the compositions of the invention show elastic properties under high deformation which are remarkably improved over those of their single components. These elastic properties are reflected above all in an improved impact strength, particularly at ambient temperature, and make this composition useful in the preparation of articles for which a high mechanical strength is demanded.

Moreover, it has been observed that the films obtained from the compositions of the invention show sealing temperatures which are considerably lower than those of films made of syndiotactic polypropylene alone, and also lower than those of films obtained from compositions in which a conventional amorphous polypropylene is used in place of the component (A).

The amorphous propylene polymers of component (A) of the compositions according to the invention, as well as the process for preparing them, are described in detail in European Patent Application EP 604,917, the contents of which is to be incorporated by reference in the present description.

These amorphous propylene polymers are substantially free of crystallinity. Their melting enthalpy values ($\Delta H_f$) are generally lower than about 20 J/g, preferably lower than about 10 J/g. Their intrinsic viscosity values [$\eta$] are preferably comprised between 1.3 and 2 dl/g.

$^{13}C$-NMR analysis carried out on the above amorphous propylene polymers provide information on the tacticity of the polymer chains, that is on the distribution of the configurations of the tertiary carbons.

The structure of the above polymers turns out to be substantially atactic. Nevertheless, it is observed that the syndiotactic dyads (r) are more numerous than the isotactic diads (m). Preferably, % r–% m>5.

The structure of the above propylene polymers turns out to be highly regioregular. In fact, signals relating to $(CH_2)_n$ sequences, where $n \geq 2$, are undetectable from the $^{13}C$-NMR analysis. Therefore, generally less than 2%, preferably less than 1%, of the $CH_2$ groups are contained in $(CH_2)_n$ sequences wherein $n \geq 2$.

The Bernoullianity index defined as:

$$B=4[mm][rr]/[mr]^2$$

has values close to unity, in particular within the range 0.8–1.2, preferably within the range 0.9–1.1.

The molecular weights of the above propylene polymers, in addition to being high, are distributed within fairly narrow ranges. An index of the molecular weight distribution is given by the ratio $M_w/M_n$ which turns out to be generally lower than 5, preferably lower than 4, more preferably lower than 3.

The propylene homopolymers having essentially syndiotactic structure of component (B) of the composition according to the invention can be prepared by using a catalytic system comprising a syndiospecific metallocene compound, such as $Me_2C(Cp)(9\text{-Flu})ZrCl_2$, and MAO, as described in the cited U.S. Pat. No. 4,892,851, the contents of which is to be incorporated by reference in the present description.

Generally, said syndiotactic propylene homopolymers show the following characteristics:

melting point of between 110° and 140° C., heat of crystallization of between 20 and 50 J/g, $[\eta]>1$ dl/g.

The propylene copolymer having an essentially syndiotactic structure of component (B) of the compositions according to the invention, as well as the process for their preparation, are described, for instance, in European Patent Applications EP 464,684 and EP 395,055, the contents of which is to be incorporated by reference in the present description.

Generally, said copolymers show the following characteristics:

melting point of between 110° and 130° C., fraction soluble in xylene at 25° of less than 10%, $[\eta]>1$ dl/g.

The syndiotactic propylene polymers of component (B) of the compositions according to the invention have intrinsic viscosity $[\eta]$ values which are preferably comprised between 1 and 3 dl/g, more preferably between 1.3 and 2 dl/g.

The preferred component (B) of the compositions according to the invention is a propylene homopolymer having an essentially syndiotactic structure.

The thermoplastic compositions according to the invention can contain additives for imparting specific properties to the articles for whose production the composition is intended.

Additives which can be used are those conventionally employed in thermoplastic polymer compositions such as, for example, stabilizers, antioxidants, corrosion inhibitors and the like.

Moreover, the compositions of the invention can contain inorganic or organic, even polymeric, fillers. The above additives and fillers can be used in conventional quantities, as is known to those skilled in the art or as can easily be determined by routine tests, generally up to 5% by weight of the final composition.

The thermoplastic compositions of the present invention can be prepared by mixing the components in Banbury-type internal mixers.

The compositions of the invention are generally obtained in the form of pellets. These can be converted into manufactured articles by the normal processing methods for thermoplastic materials, such as moulding, extrusion, injection and the like.

In particular, manufactured articles obtained by moulding processes are endowed with elastic properties which are of particular interest for articles for which strength at high deformations is demanded.

On the other hand, films obtained by extrusion processes show sealing temperatures which are of particular interest in the field of low-temperature-heat-sealing films.

As shown by the data of the examples given below, the compositions of the invention, differently from their individual components, show a good combination of elasto-mechanical properties.

Generally the component (A), while having good elastic properties at low deformations, does not show satisfactory values of the strength at break.

Conversely, the component (B) is generally endowed with good values of the strength at break, but the elastic properties are poorer compared with the compositions of the invention (higher tension set values).

The high elasto-plastic properties of the compositions of the invention are demonstrated by low tension set values combined with high strength at break values. In particular, the elastic properties of the composition of the invention are remarkably improved with respect to those of its individual components at high deformations. In fact, while fracture is invariably observed in samples of the individual components making up the composition after 200% elongation, the samples of the compositions of the present invention, when subjected to the same elongation, show only a permanent deformation which, in the best observed cases, is lower than 50%.

In addition to good mechanical properties the compositions of the invention are endowed with good transparency.

As shown by the examples given below, the films obtained from the subject compositions show a sealing-initiation-temperature (SIT) which is substantially lower than the films obtained from component (B) alone, as well as than the films obtained by using, in place of the component (A), a conventional amorphous polypropylene (C).

Further advantages of the present invention will become evident from the examples which are given solely for illustrative purposes and do not limit the invention itself.

CHARACTERIZATIONS

The intrinsic viscosity $[\eta]$ was measured in tetralin at 135° C.

The $^{13}$C-NMR analysis of the polymers were carried out by means of a Bruker AC200 instrument at 50.323 MHz, using $C_2D_2Cl_4$ as solvent (about 300 mg of polymer dissolved in 2.5 ml of solvent), at a temperature of 120° C.

The molecular weight distribution was determined by GPC analysis, carried out on a WATERS 150 instrument in ortho-di-chlorobenzene at 135° C.

The differential scanning calorimetry (DSC) measurements were carried out on a DSC-7 instrument from Perkin Elmer Co. Ltd. according to the following procedure. About 10 mg of the sample were heated from 40° C. to 200° C. at a rate of 20° C./minute; the sample was held for 5 minutes at 200° C. and then cooled to 40° C. at the same rate. A second heating scan was then carried out using the same procedure as the first one. The given values are reheat values.

The physico-mechanical characterizations were carried out according to the methods indicated below:

| | |
|---|---|
| flexural modulus (E') | ASTM - D 5023 |
| strength at break | ASTM - D 412 |
| elongation at break | ASTM - D 412 |
| strength at yield | ASTM - D 412 |
| elongation at yield | ASTM - D 412 |
| haze | ASTM - D 1003 |

The tension set measurements were performed according to the following procedure. A specimen of lenght $l_o$ was elongated at a rate of 20 cm/min, it was held under stress for 10 minutes, thereafter the stress was released at the same rate. The lenght l of the specimen after 10 minutes at rest was measured. The tension set was calculated as $[(l-l_o)/l_o] \times 100$.

The physico-mechanical characterizations listed above were carried out on samples obtained from a plate of 1 mm thickness, prepared by compression-moulding under the following conditions: 5 minutes at 200° C. without pressure, then 5 minutes under pressure, and then cooling to 23° C. under pressure with circulating water.

The sealing-initiation-temperature (SIT) is defined as the lowest temperature at which two films must be sealed together in order to achieve a seal strength higher than 0.250 kg/2 cm. The SIT was determined on films consisting of two layers, namely a top layer of a polymer composition according to the invention, added with stabilizers, and a base layer of a commercial polypropylene homopolymer. The total film thickness was less than 20 μm, the top layer accounting for less than 2 μm of the total thickness. The film was obtained by using the typical coextrusion process followed by a biaxial stretching process until the required thickness was reached.

EXAMPLE 1 (COMPARISON)

Preparation of component (A1)

A 1.35 l steel autoclave, purged with a hot stream of propylene, was filled with 480 g of propylene at 40° C. Then 23 ml of a toluene solution containing 846 mg of MAO and 4 mg of dimethylsilanediyl-bis(9-fluorenyl)zirconium dichloride, after previous aging of the solution for 10 minutes, were injected by excess propylene pressure.

The MAO used was a commercial product (Schering, molecular weight 1400) in a 30% by weight solution in toluene. After removal of the volatile fractions in vacuo, the glassy material was crushed until a white powder was obtained which was subsequently treated in vacuo (0.1 mm Hg) for 4 hours at a temperature of 40° C.

The dimethylsilanediyl-bis(9-fluorenyl)zirconium dichloride used was prepared as described in Example 1 of European Patent Application EP 604,917.

The temperature inside the autoclave was then raised to 50° C. and the polymerization reaction was carried out for 1 hour.

After degassing of the unreacted monomer and drying of the product, 100 g of solid and transparent polypropylene, soluble in hot chloroform and having an intrinsic viscosity of 2.23 dl/g, were obtained.

The $^{13}$C-NMR analysis of the methyl group signals gave the following triads compositions: % mm=17, % mr=48, % rr=35; B=1.0; % r-% m=18. No signals relating to $(CH_2)_n$ sequences, where n≧2, were detected.

The GPC analysis gave the following values: $M_w$=381,000 g/mol; $M_w/M_n$=2.5.

The DSC analysis did not show any peak attributable to an enthalpy of fusion ($\Delta H_f$).

The data of the mechanical characterization of the component (A1) are shown in Table 1.

EXAMPLE 2 (COMPARISON)

Preparation of component (B1)

750 g of propylene and 2.5 bar of hydrogen were fed at ambient temperature to a 2.3 l autoclave fitted with a stirrer with magnetic drive and thermostatically controlled by circulation of a water/steam mixture, previously purged with a propylene stream at 80° C. for 1 hour.

After the temperature had been reaised to 50° C., 6.2 ml of a toluene solution aged for 5 minutes and containing 0.5 mg of $Ph_2C(Cp)(9-Flu)ZrCl_2$ and 156 mg of MAO were charged to the autoclave. The polymerization reaction was carried out for 90 minutes while keeping the temperature constant.

At the end of the reaction, the polymer was recovered by degassing the unreacted monomer and drying the solid in an oven at 60° C. in vacuo.

110 g of polymer having an intrinsic viscosity of 1.89 dl/gm were obtained.

The DSC analysis gave the following values: melting point=138.4° C.; $\Delta H_f$=43.3 J/g.

The data of the mechanical characterization of the component (B1) are shown in Table 1.

EXAMPLE 3

Preparation of a composition (A1)/(B1) An amount of the component (A1) and an amount of the component (B1) such as to give an (A1)/(B1) weight ratio of 70/30 and a quantity of Irganox B215 (CIBA-GEIGY) antioxidant equivalent to 0.2% of the total weight of the blend were mixed for 5 minutes at 200° C. in a Brabender Plasticorder PLD651 mixer W50 and then compression-moulded under the conditions described above.

The data of the mechanical characterization of the blend are shown in Table 1.

EXAMPLES 4–5

Preparation of compositions (A1)/(B1)

Using the same procedure described in Example 3, two compositions according to the invention were prepared, each for a total of 40 g of components (A1) and (B1) but in differing ratios.

The percentages by weight of the components (A1) and (B1) as well as the data of the mechanical characterization for each composition are shown in Table 1.

EXAMPLE 6

Preparation of the component (A2)

42 kg of propylene were fed at 40° C. to a 100 l steel autoclave, purged with a hot stream of propylene. Then, 100 ml of a toluene solution containing 26 g of MAO and 130 mg of dimethylsilanediyl-bis(9-fluorenyl)zirconium dichloride were injected by means of excess propylene pressure.

The characteristics of the MAO used and its treatment are described in Comparison Example 1.

The dimethylsilanediyl-bis(9-fluorenyl)zirconium dichloride used was prepared as described in Example 1 of European Patent Application EP 604,917.

After the internal temperature of the autoclave had been raised to 50° C., the polymerization reaction was carried out for 3 hours.

After degassing of the unreacted monomer and drying of the product, 12.5 g of solid and transparent polypropylene, soluble in hot chloroform and having an intrinsic viscosity of 2.57 dl/g, were recovered.

The GPC analysis gave the following values: $M_w$=472,000 g/mol; $M_w/M_n$=2.3.

The DSC analysis did not show any peak attributable to the enthalpy of fusion ($\Delta H_f$).

Preparation of the component (B2)

The same procedure as described in Comparison Example 2 was followed, but using 7 ml of a toluene solution containing 1 mg of Ph$_2$C(Cp)(9-Flu)ZrCl$_2$ and 190 mg of MAO. The polymerization reaction was carried out for 120 minutes, while keeping the temperature constant. At the end of the reaction, the polymer was recovered by degassing unreacted monomer and drying the solid in an oven at 60° C. in vacuo. 61 g of polymer having an intrinsic viscosity of 3.29 dl/g were thus recovered.

The following results were obtained from the DSC analysis: 1st melting point=112.9° C.; 2nd melting point=121° C.; $\Delta H_f$=32 J/g.

Determination of the SIT

A composition consisting of 20% by weight of component (A2) and 80% by weight of component (B2) with added stabilizers was prepared. The SIT was determined on a film obtained from this composition following the procedure described above.

The data of the SIT are shown in Table 2.

EXAMPLE 7 (COMPARISON)

Determination of the SIT

The same procedure as described in Example 6 was followed, but no component (A2) was used.

The data of the SIT are shown in Table 2.

EXAMPLE 8 (COMPARISON)

Determination of the SIT

The same procedure as described in Example 6 was followed but, instead of component (A2), 20% of a conventional amorphous polypropylene (C) was used, having the following characteristics: intrinsic viscosity of 0.45 dl/g; melting point=157.8° C.; $\Delta H_f$=7 J/g; $M_w$=27,900 g/mol and $M_w/M_n$=6.

The data of the SIT are shown in Table 2.

What is claimed is:

1. A thermoplastic composition consisting essentially of:
   (A) 1 to 99% by weight of an amorphous propylene polymer having the following characteristics:
   [$\eta$] greater than 1 dl/g;
   percentage of syndiotactic diads (r) minus percentage of isotactic diads (m) greater than 0;
   less than 2% of the CH$_2$ groups contained in (CH$_2$)$_n$ sequences wherein n is greater than or equal to 2;
   Bernoullianity index equal to 1±0.2;
   no detectable melting enthalpy value ($\Delta H_f$); and
   (B) 1 to 99% by weight of a propylene polymer having an essentially syndiotactic structure, optionally containing from 0.1 to 30% by moles of units deriving from α-olefins of formula CH$_2$=CHR in which R is a hydrogen atom or an alkyl group having from 2 to 10 carbon atoms.

2. The thermoplastic composition according to claim 1, wherein the ratio of the quantities by weight of the components (A)/(B) is from 30:70 to 70:30.

3. The thermoplastic composition according to claim 1, wherein the amorphous propylene polymer has intrinsic viscosity values [$\eta$] from 1.3 to 2 dl/g.

4. The thermoplastic composition according to claim 1, wherein the amorphous propylene polymer has % of syndiotactic dyads (r)–% of isotactic dyads (m)>5.

5. The thermoplastic composition according to claim 1, wherein the amorphous propylene polymer has less than 1% of the CH$_2$ groups contained in (CH$_2$)$_n$ sequences wherein n≧2.

6. The thermoplastic composition according to claim 1, wherein the amorphous propylene polymer has a Bernoullianity index within the range 0.9–1.1.

7. The thermoplastic composition according to claim 1, wherein the amorphous propylene polymer has a value of the ratio $M_w/M_n$ lower than 3.

8. The thermoplastic composition according to claim 1, wherein the component (B) is a propylene homopolymer

TABLE 1

| EXAMPLE | component (A1) (% by weight) | component (B1) (% by weight) | tension set 100% | tension set 200% | tension set 300% | Flexural modulus (MPa) | Strength at break (MPa) | Elongation at break (%) | Strength at yield (MPa) | Elongation at yield (%) | Haze (%) |
|---|---|---|---|---|---|---|---|---|---|---|---|
| 1 (COMP.) | 100 | 0 | 18 | broken | broken | 5.3 | >1.2 | >1000 | — | — | 20 |
| 2 (COMP.) | 0 | 100 | 58 | broken | broken | 750 | 15 | 360 | 21 | 8.5 | 60 |
| 3 | 70 | 30 | 19 | 44 | 76 | 12 | 7 | 1295 | — | — | 36 |
| 4 | 50 | 50 | 32 | 71 | 118 | 98 | 13 | 920 | 6 | 85 | 45 |
| 5 | 30 | 70 | 42 | 91 | 132 | 420 | 15 | 910 | 10.5 | 32 | 47 |

TABLE 2

| EXAMPLE | component (A2) (% by weight) | component (B2) (% by weight) | component (C) (% by weight) | SIT (°C.) |
|---|---|---|---|---|
| 6 | 20 | 80 | 0 | 80 |
| 7 (COMP.) | 0 | 100 | 0 | 108 |
| 8 (COMP.) | 0 | 80 | 20 | 108 | having an essentially syndiotactic structure, which shows the following characteristics:
   melting point of between 110° and 140° C.,
   heat of crystallization of between 20 and 50 J/g,
   [$\eta$]>1 dl/g.

9. The thermoplastic composition according to claim 1, wherein the component (B) is a propylene copolymer having an essentially syndiotactic structure, which shows the following characteristics:
   melting point of between 110° and 130° C.,
   fraction soluble in xylene at 25° of less than 10%,
   [$\eta$]>1 dl/g.

10. The thermoplastic composition according to claim 1, wherein the propylene polymer having an essentially syndiotactic structure has intrinsic viscosity [η] values from 1.3 to 2 dl/g.

11. A manufactured article obtained from a thermoplastic composition according to claim 1.

12. The manufactured article according to claim 1, which is obtained by a moulding process.

13. A low-temperature-heat-sealing film obtained from a thermoplastic composition according to claim 1.

* * * * *